United States Patent [19]

Beavon

[11] 3,878,289
[45] Apr. 15, 1975

[54] PROCESS FOR THE REMOVAL OF HYDROGEN CYANIDE FROM GAS STREAMS

[75] Inventor: David K. Beavon, Los Angeles, Calif.

[73] Assignee: The Ralph M. Parsons Company, Los Angeles, Calif.

[22] Filed: Aug. 24, 1972

[21] Appl. No.: 283,501

[52] U.S. Cl. ............... 423/219; 423/236; 423/244; 423/354
[51] Int. Cl. .............................................. C01c 3/04
[58] Field of Search ........... 423/210, 230, 236, 244, 423/355, 373, 354, 219; 260/538, 542; 252/454, 463, 476

[56] References Cited
UNITED STATES PATENTS

| | | | |
|---|---|---|---|
| 1,312,116 | 8/1919 | Hidden | 423/355 |
| 1,781,664 | 11/1930 | Rockwell | 423/236 |
| 1,789,194 | 1/1931 | Rockwell | 423/236 |
| 1,900,883 | 3/1933 | Lusby | 423/244 |
| 1,947,776 | 2/1934 | Huff et al. | 423/230 |
| 1,990,708 | 2/1935 | Pier et al. | 423/230 |
| 2,743,153 | 4/1956 | Marsh et al. | 423/230 |
| 2,817,580 | 12/1957 | Marsh et al. | 423/230 |
| 3,058,800 | 10/1962 | Frevel et al. | 423/244 |
| 3,428,575 | 2/1969 | Pijpers et al. | 423/244 |

OTHER PUBLICATIONS

Clark; "The Theory of Adsorption and Catalysis," Academic Press, New York, N.Y. 1970 pp. 3,272.
Newman et al., "Alumina Properties," Aluminum Co. of America Tech. Paper No. 10; Second Revision, Pittsburg, Pa. 1960 pp. 58.

Primary Examiner—O. R. Vertiz
Assistant Examiner—Brian E. Hearn
Attorney, Agent, or Firm—Christie, Parker & Hale

[57] ABSTRACT

Hydrogen cyanide contained in gas streams such as coke oven gas streams, is eliminated by catalytically hydrolyzing the hydrogen cyanide in the presence of water to ammonia and using as the catalyst one or more of the alkali metal hydroxides supported on alumina, alumina-silica, or silica. The formed ammonia is readily separated from the gas stream by any conventional technique.

When unsaturated hydrocarbons and oxygen are present in the treated gas stream, the gas stream may be hydrogenated to eliminate oxygen and at least partially saturate the unsaturated hydrocarbons to prevent catalyst degradation.

18 Claims, No Drawings

PROCESS FOR THE REMOVAL OF HYDROGEN CYANIDE FROM GAS STREAMS

BACKGROUND OF THE INVENTION

The present invention relates to the elimination of hydrogen cyanide from gas streams, particularly gas streams which also contain hydrogen sulfide and from which hydrogen sulfide removal is required.

As typical of such gas streams are coke oven gas streams. A typical coke oven gas stream, normally contains on a dry basis, about 40 percent by volume hydrogen, about 1 percent by volume carbon dioxide, about 1 percent volume nitrogen, up to about 1 percent by volume oxygen, from about 0.1 to about 0.25 percent by volume hydrogen cyanide, about 0.8 to about 1.5 percent by volume ammonia, about 0.3 to about 3 percent by volume hydrogen sulfide, about 0.005 to about 0.01 percent by volume carbonyl sulfide and from about 0.1 to about 0.3 percent by volume carbon disulfide. The balance of the gas stream is composed of hydrocarbons, the dominant constituent of which is methane.

When used as a fuel in a steel mill, or as a town gas, the hydrogen cyanide, ammonia, hydrogen sulfide, carbonyl sulfide, and carbon disulfide are regarded as impurities which should be removed to the maximum extent possible.

Of the impurities, sulfur may be tolerated in its various forms to the extent of about 0.1 percent by volume where the coke oven gas is used in steel mills, whereas only a fraction of that amount is acceptable for use in town gas.

Methods for elimination of ammonia and hydrogen sulfide by a variety of absorption techniques have been well developed and known in the art. A problem, however, exists in the removal of hydrogen cyanide which must be separated from the gas stream by some means, because it will contaminate the several popular systems for hydrogen sulfide removal and create pollution problems.

One process for H$_2$S removal is the "Seaboard Process" in which the process gas stream is passed countercurrent to a solution containing 3 to 5 percent sodium carbonate where the sodium carbonate reacts with hydrogen sulfide to form sodium hydrogen sulfide. The reaction is then reversed and the hydrogen sulfide eliminated. This process, presently, has several disadvantages which precludes its use under present governmental air and water pollution standards. This is because the hydrogen sulfide removed from the gas stream is ultimately exhausted to the atmosphere and the hydrogen cyanide is converted to sodium thiocyanate which causes contamination of the circulating liquor requiring discarding of the solution on a regular basis as a water pollutant.

Another process is the "Thylox Process" which is another liquid system where hydrogen sulfide is removed from the gas stream and the elemental sulfur recovered. The gas is scrubbed in a weak solution of sodium thioarsenate at a pH of 7.5 to 8. In the process sodium thioarsenate reacts with hydrogen sulfide to form a sodium arsenate solution containing sulfur and water. The sodium arsenate, in turn, reacts with oxygen to reform the sodium thioarsenate and free sulfur. Efficiencies of about 98 percent are obtained.

The process has the disadvantage of high capital costs, high costs of reagents, high toxicity, and the necessity of discarding the solutions due to the formation of sodium thiocyanate and sodium thiosulfate which are toxic pollutants.

Because of the disadvantages of the previously disclosed processes there has been developed what has become known as the "Stretford Process" which permits removal of hydrogen sulfide, its conversion to sulfur, using water-soluble, stable, non-toxic chamicals.

The use of the process is hampered, however, where the gas stream contains hydrogen cyanide. If the hydrogen cyanide is allowed to pass into the Stretford Process solution the hydrogen cyanide in the gas stream will react with the chemicals to form sodium thiocyanate and sodium thiosulfate which requires the problem of a disposal of a portion of the solutions daily, or mass disposal of the solution once the thiocyanate and thiosulfate concentrations reach a level of about 40 percent by volume. In either event, disposal of the solution presents serious water pollution problems.

If hydrogen cyanide is not removed, treatment of a gas stream for removal of hydrogen sulfide precludes the use of many alternative systems. For example, aqueous alkanolamine solutions, such as monoethanolamine, diethylanolamine and triethanolamine solutions, which are highly effective for H$_2$S removal cannot be used because the hydrogen cyanide reacts with them to form complex degradation products requiring discarding of the solution again as a water pollutant.

As a result of the difficulties caused by the presence of hydrogen cyanide, most coke oven gases are not treated to remove H$_2$S, but burned as is. Typically, the untreated gas contains 300 to 400 grains of H$_2$S per one hundred cubic feet, whereas the U.S. Environmental Protection Agency has recommended that such gas be treated to reduce H$_2$S content to 10 grains per one hundred cubic feet.

There is, therefore, a strong need for a hydrogen cyanide conversion system which may be integrated into existing processes for treatment of gas streams, such as coke oven gas streams, which involves steps for removal of both hydrogen sulfide and ammonia.

It is known that hydrogen cyanide may be hydrolyzed to form ammonia and carbon monoxide by the reaction:

$$HCN + H_2O \longrightarrow NH_3 + CO$$

(1)

and that CO can, if necessary, be converted to CO$_2$ and H$_2$ by $$CO + H_2O \longrightarrow CO_2 + H_2$$

(2)

Most processes for this conversion have been noncatalytic in nature, and concerned primarily with the production of ammonia from hydrogen cyanide.

In U.S. Pat. No. 2,817,580, for instance, there is disclosed a process for converting the hydrogen cyanide contained in a hydrogen sulfide concentrate removed from coal gas or coke oven gas, in which the ratio of hydrogen cyanide to hydrogen sulfide by volume ranges from 1 to 12 to 1 to 3 and in which the hydrogen sulfide content of the concentrate is at least 10 percent by volume. In this process, it is disclosed that the hydrogen cyanide may be reacted with water to form ammonia at a temperature from 200°C to about 400°C in the presence of a catalyst selected from the group consisting of the gamma form of aluminum metahydroxide and the gamma form of anhydrous alumina.

In the examples provided, the feed stream contains hydrogen sulfide in amounts of 50.4 percent and 75 percent and hydrogen cyanide in amounts of 5.2 and 8 percent by volume, the remainder of the gas stream being inert, except for the presence of water for reaction with the hydrogen cyanide.

None of the other constituents normally found in a coke oven gas stream were present because of their prior removal by undisclosed means. Relative to their normal concentrations in a coke oven gas stream, the concentration of hydrogen cyanide and hydrogen sulfide in the process gas streams were high.

SUMMARY OF THE INVENTION

According to the present invention, there is provided a process for the conversion of hydrogen cyanide contained in gas streams to ammonia and, in particular, to a process wherein the hydrogen cyanide concentration in the gas stream is extremely low, but yet sufficient to present a problem from the standpoint of treatment of the gas stream.

The process comprises, in general, contacting the gas stream in the presence of water with a catalyst comprising one or more of the alkali metal hydroxides supported on alumina, alumina silica or silica to hydrolyze the hydrogen cyanide to ammonia, the catalyst having a high absorptivity for water and hydrogen cyanide. The preferred catalysts are those which contain sodium hydroxide, potassium hydroxide, lithium hydroxide as well as mixtures thereof.

The hydrolysis reaction is carried out at temperatures from about 200°F to about 800°F preferably, from about 200°F to 400°F at space velocities ranging from about 500 to about 5,000 volumes of gas per unit volume of catalyst per hour for gas streams of low HCN concentrations. As hydrogen cyanide concentration increases, however, space velocity may have to be reduced depending on the degree of conversion desired as conversion tends to become inversely proportional to space velocity as hydrogen cyanide concentration increases.

Pressures may range from ambient to pressures at which the gas stream containing hydrogen cyanide as an impurity is being processed.

Conversion of about 99 percent or more of HCN present in the gas stream is achievable.

This essentially total removal of hydrogen cyanide from the gas stream permits the gas stream to be treated by conventional means for removal of ammonia and hydrogen sulfide without presenting a problem of pollution.

Since most of the gas streams treated are industrial gases, such as coke oven gas and gases produced by the cracking of petroleum or gasification or petroleum or coal, there will normally be present in the gas stream unsaturated hydrocarbons such as acetylene, ethylene, pyridine and the like, and in many instances, oxygen.

If oxygen is present, it will tend to react with unsaturates which would otherwise pass through the system unchanged and react with them to form many substances which deposit on and foul the catalyst.

In this event, the gas stream should be hydrogenated to at least convert the oxygen to water and, when desirable, hydrogenate some of the unsaturated hydrocarbons present.

If insufficient hydrogen, where required, or water is present in the gas stream, for the hydrogenation and hydrolysis reactions to be carried out, hydrogen and/or water may be added from an external source. For this situation, the amount of hydrogen present for a typical industrial gas stream should be at least the stoichiometric amount required for conversion of oxygen to water. Sufficient water must also be provided for the hydrolysis reactions.

DESCRIPTION

According to the present invention, there is provided a process for the removal of hydrogen cyanide from gas streams, in particular, industrial gas streams such as coke oven gases, petroleum cracked gases, gasified coal or petroleum which also contain sulfur compounds as intolerable impurities, the catalyst being used for conversion of hydrogen cyanide to ammonia alone or in conjunction with a hydrogenation/hydrolysis system for the conversion of sulfur compounds to hydrogen sulfide.

For the simplest case, the process employed converts hydrogen cyanide by hydrolysis in the presence of water to ammonia by contact with a supported alkali metal hydroxide catalyst having a high absorptivity for both water and hydrogen cyanide.

More specifically, however, the process pertains to the conversion of hydrogen cyanide in industrial gas streams which contain unsaturated hydrocarbons and oxygen which tend to form catalyst fouling, tar-like substances and which may also contain sulfur compounds such as COS and $CS_2$ which must be removed to the extent possible to avoid problems of air pollution.

As specific examples of industrial gases there may be mentioned a typical coke oven gas stream, gas streams obtained by the cracking or gasification of petroleum or the gasification of coal.

Where unsaturated hydrocarbons such as acetylene, pyridine and the like along with oxygen are present, and their presence is the usual case, they must be coped with, otherwise they tend to react with oxygen to form tars or gums which deposit on the catalyst employed and inhibit its ability to hydrolyze hydrogen cyanide to ammonia. Thus, if oxygen is present, it is also desirable to hydrogenate at least the oxygen to water to prevent the formation of tars and gums, which form deposits which occlude the catalyst and eventually precede the hydrolysis of hydrogen cyanide.

The catalyst used for the hydrolysis of hydrogen cyanide in the practice of this invention are the alkali metal hydroxides supported on alumina, silica, alumina-silica, and the like. Natural or synthetic zeolites which contain alkali metal hydroxides may also be employed provided they have a sufficiently stable structure and good absorptivity for both water and hydrogen cyanide. Preferably, the catalyst is one containing the hydroxide of one or more of the alkali metals sodium, lithium and potassium.

The catalyst can be conveniently prepared by immersion of the support in a solution of a selected alkali hydroxide withdrawn and allowed to dry.

The amount of alkali hydroxide deposited on the catalyst is not narrowly critical as unusually high activity can be obtained at alkali-metal contents as low as 0.1 percent by weight based on the weight of the alkali metal and support. Preferably, the alkali metal content should be from about 2 to about 10 percent by weight based on the total weight of catalyst and support.

For example, the catalyst containing potassium hydroxide as 4 percent by weight potassium on an alumina support has been found to be effective to convert 99 percent of hydrogen cyanide contained in a typical coke oven or town gas stream at a temperature of about 300°F at a space velocity of 3,000 volumes of gas per unit volume of catalyst per hour.

By comparison, other alumina supported catalysts require much higher temperatures and lower space velocities to achieve the same degree of conversion.

The process of this invention has, therefore, the important advantage in that less heat is required to raise the temperature of the gas stream to the temperature required for conversion, yet extremely high rates of conversion are achievable.

In general, employing the catalyst of this invention in a process for the hydrolysis of hydrogen cyanide in typical industrial gases to ammonia may be carried out at temperatures ranging from about 200°F to about 400°F at space velocities varying from 500 to about 5,000 volumes per unit volume of catalyst per hour, with temperature and space velocity being adjusted proportionately to achieve the degree of hydrolysis desired. Of the two, namely, temperature and space velocity, space velocity is the variable usually adjusted. As will be appreciated, to achieve a given degree of conversion, space velocity must be reduced as HCN concentration increases. It is less desirable to modify temperature to achieve the same result, as it is preferred to operate within the lower temperature range.

While not bound by theory, it is not known in what state the alkali metal hydroxide is present on the support employed and it is believed some complex transformation occurs. There is a probability that eventually the alkali metal is at least partially converted to a sulfide or carbonate state. For, it has been observed that with continued use the catalyst becomes more active as, at a given temperature, rate of conversion increases with time. That is, it has been experienced thus far that to achieve a desired degree of hydrolysis of hydrogen cyanide space velocity can be increased, within limits, the longer the catalyst is in service.

The gas stream, after contact with the catalyst may then be passed to any convenient system for removal of ammonia to make the gas stream, where it contains hydrogen sulfide, more amenable to hydrogen sulfide separation.

As mentioned, typical of streams containing sulfur compounds are industrial coke oven or town gas streams, gas streams obtained by the cracking or gasification of hydrocarbons, the gas streams obtained by the gasification of coal and the like.

Where the gas stream also contains unsaturated hydrocarbons which would otherwise not affect the catalyst, but which would tend to react with oxygen, if present, to form tars which gum the catalyst and/or COS and $CS_2$ which tend to inactivate the catalyst by converting it to the sulfate form, there is employed an initial hydrogenation and/or hydrolysis operation to eliminate $O_2$, COS and $CS_2$ from the gas stream prior to hydrolysis of HCN.

Hydrogenation of the gas stream prior to hydrolysis of HCN is normally carried out in the presence of a catalyst. Useful catalysts are those containing metals of Groups V$a$, VI$a$, VIII and the Rare Earth series of the periodic table defined by Mendeleeff, published as the "Periodic Chart of the Atoms" by W.N. Welch Manufacturing Company and incorporated herein by reference. The catalysts may be supported or unsupported, although catalysts supported on a silica, alumina or silica-alumina base are preferred. The preferred catalysts are those containing one or more of the metals, cobalt, molybdenum, iron, chromium, vanadium, thoria, nickel, tungsten (W) and uranium (U).

The hydrogenation step also functions to convert any $SO_2$ and free sulfur present in the gas to $H_2S$. Also, because water is present, COS and $CS_2$ may be hydrolyzed to $H_2S$, although this may require operating the initial hydrogenation-hydrolysis operation at temperatures higher than that required for hydrolysis of HCN. This is important to the removal, when necessary, of intolerable sulfur compounds as $H_2S$ in a subsequent absorption operation without the formation of corrosive sulfurous and polythionic acids.

Hydrogenation may be carried out at the same temperatures and at space velocities as employed for the hydrolysis reaction, and, in fact, within the same reaction chamber, the gas stream first contacting the hydrogenation catalyst, then contacting the hydrolysis catalyst.

Temperature wise, this mainly depends on whether COS and $CS_2$ are to be hydrolyzed to $H_2S$ for removal. In this instance, higher temperatures are required for their hydrolysis and their conversion to $H_2S$ is best carried out in a separate reaction vessel.

Following treatment of the gas stream independent of its make up, it passed to any conventional system for removal of $NH_3$.

Where $H_2S$ is present, a most expedient way is to contact the gas stream with either sulfuric or phosphoric acid to form ammonium sulfate or ammonium phosphate which settle from the liquor as crystals and removed therefrom by any conventional means as products of commerce. The gas stream is then treated for $H_2S$ removal again by any conventional extraction system.

Any number of extraction methods are feasible for this step with absorption methods being preferred. For instance, a cooled process gas may be passed through alkaline absorption solutions which are continuously regenerated by oxidation to produce elemental sulfur using catalysis such as sodium vanadate, sodium anthraquinone disulfonate, sodium arsenate, sodium ferrocyanide, iron oxide, iodine and like catalysts.

A convenient alternative is to use absorption solutions containing amines, sulfonates, potassium carbonates and like absorbents for hydrogen sulfide which can be continuously regenerated by steam stripping to produce hydrogen sulfide.

The preferred extraction system is that known as the Stretford Process, which employs a solution containing sodium carbonate, sodium vanadate and sodium anthraquinone disulfonic acid as the absorbent used in the absorber. The absorbed hydrogen sulfide is oxidized by sodium vanadate to form sulfur in an absorber and time tank, and the absorbing solution is then regenerated by oxidation with air in an oxidizer. The sulfur is recovered from the solution by conventional means such as flotation, filtration, centrifuging, melting, decantation under pressure and the like.

Depending on the makeup of the gas stream processed, it may be necessary to add water and/or hydrogen to provide the amount of hydrogen required for the hydrogenation reactions to be carried and water for the hydrolysis reactions. Generally, the process may be carried by meeting the stoichiometric requirements for the gas stream. Preferably, however, excess water and/or hydrogen should be present to promote chemical equilibrium.

Where the gas stream is a typical coke oven gas, the carbon monoxide formed during the hydrolysis of HCN may be left in the gas stream and fed to the burner. For a gas stream intended for other purposes, such as a vent gas stream, the carbon monoxide may be reacted with water by known techniques to inert carbon dioxide and hydrogen.

EXAMPLE 1

A gas stream containing 0.024% by volume HCN (240 ppm), 0.5% by volume $O_2$, 1.0% by volume $H_2S$, 50% by volume $H_2$, the balance being methane, was passed over a freshly prepared catalyst containing 4% by weight potassium deposited on an alumina support. Runs were made under a variety of conditions to determine % HCN conversion. In all instances, reactions were carried out at atmospheric pressure and in the presence of 19.7% by volume $H_2O$ added for the hydrolysis reaction. The results are shown in Table 1.

Table 1

| Run No. | S.V.[1] | T,°F | % HCN Removed | HCN in effluent (ppm) |
|---|---|---|---|---|
| 1 | 1000 | 482 | 91.6 | 20 |
| 2 | 2000 | 392 | 94.0 | 14 |
| 3 | 1000 | 392 | 94.0 | 14 |
| 4 | 1000 | 302 | 99.0 | 2 |
| 5 | 2000 | 302 | 99.0 | 2 |
| 6 | 3000 | 212 | 75.0 | 60 |
| 7 | 1000 | 212 | 73.0 | 65 |
| 8 | 1000 | 257 | 87.0 | 31 |
| 9 | 3000 | 257 | 87.0 | 31 |

[1]Space Velocity
The total hours of operation were 30.

EXAMPLE 2

Using the catalyst of Example 1, there was treated a gas stream having the composition 0.07% (700 ppm) by volume HCN, 1.20% by volume $O_2$, 0.83% by volume $H_2S$, 9.9% by volume $CO_2$, 7.7% by volume CO, 15.7% by volume $N_2$, 24.0% by volume $CH_4$, 39.8% by volume $H_2$, and 0.24% by volume COS. Again, the gas stream was moisturized to a 19.7% by volume water vapor. A space velocity of 2,000 standard cubic feet per unit volume of catalyst was used, and complete hydrolysis of HCN occurred at temperatures of 302°F and 392°F. Total hours for the two runs was 38. This gave a direct indication that activity of the catalyst increased with use.

EXAMPLE 3

Three catalysts were evaluated for their ability to convert 99% of HCN contained in a moisturized gas stream.

As representative of the catalysts of this invention there was employed the catalyst used in Examples 1 and 2. At an operating temperature of 302°F, 99% conversion of HCN to ammonia was achieved at space velocities of 1,000, 2,000 and 3,000 volumes per unit volume catalyst per hour.

Control A

In comparison, the procedure of Example 3 was repeated, the catalyst used containing a metal of Group VIII, a Rare Earth metal, and a Group Va metal of the Periodic Table supported on alumina. To achieve 99% conversion of HCN required an operating temperature of 482°F and a space velocity of only 1,500 volumes per unit volume of catalyst per hour.

Control B

As a third comparison, there was employed an alumina supported catalyst containing cobalt and molybdenum. Using this catalyst, the temperature required to achieve 99% conversion was 700°F and the space velocity was only 1,000 volumes of gas per unit volume of catalyst per hour.

What is claimed is:

1. A process for the removal of hydrogen cyanide from gas streams which comprises contacting the gas stream in the presence of water in an amount at least sufficient to hydrolyze the contained hydrogen cyanide with a catalyst consisting of at least one alkali metal hydroxide deposited on a support selected from the group consisting of alumina, silica, alumina-silica and the zeolites in which the alkali metal hydroxide deposited on the support as alkali metal is present in an amount of from about 0.1 to about 10 percent by weight based on the total weight of the alkali metal and the support at a temperature of from about 200°F to about 800°F for a time sufficient to hydrolyze a substantial quantity of the hydrogen cyanide present in the gas stream to ammonia.

2. A process as claimed in claim 1 in which hydrolysis of the hydrogen cyanide is carried out at a temperature from about 200°F to about 400°F.

3. A process as claimed in claim 1 in which the alkali metal is selected from the group consisting of lithium, sodium, potassium, and mixtures thereof.

4. A process as claimed in claim 1 in which the catalyst contains from about 2 to about 10 percent alkali metal and the alkali metal is selected from the group consisting of lithium, sodium, potassium, and mixtures thereof.

5. A process for the removal of hydrogen cyanide from industrial gas streams which comprises contacting an industrial gas stream containing up to about 0.25 percent by volume hydrogen cyanide and an amount of water at least sufficient to hydrolyze the hydrogen cyanide with a catalyst consisting of at least one alkali metal hydroxide deposited on a support selected from the group consisting of alumina, silica and silica-alumina and the zeolites in which the deposited alkali metal hydroxide as the alkali metal is present in an amount of from about 0.1 to about 10 percent by weight based on the total weight of the alkali metal and support at a temperature from about 200°F to about 800°F for a time sufficient to hydrolyze substantially all of the hydrogen cyanide contained in the gas stream to ammonia.

6. A process as claimed in claim 5 in which hydrolysis is carried out at a space velocity of from about 500 to about 5,000 volumes of gas per unit volume of catalyst per hour.

7. A process as claimed in claim 6 in which conversion is carried out at a temperature from about 200°F to about 400°F.

8. A process as claimed in claim 1 in which the gas stream contains at least unsaturated hydrocarbons and oxygen and in which at least the oxygen is hydrogenated to water prior to contacting the gas stream with the supported alkali hydroxide catalyst by contacting the gas stream in the presence of hydrogen in an amount at least sufficient to hydrogenate the contained oxygen with a supported catalyst containing at least one metal of Group V$a$, VI$a$, VIII of the periodic table defined by Mendeleef at a temperature sufficient for hydrogenation to occur.

9. A process as claimed in claim 5 in which the industrial gas stream contains at least unsaturated hydrocarbons and oxygen and in which at least the oxygen is hydrogenated to water prior to contacting the gas stream with the supported alkali hydroxide catalyst by contacting the gas stream in the presence of hydrogen in an amount at least sufficient to hydrogenate the contained oxygen with a supported catalyst containing at least one metal of Group V$a$, VI$a$, VIII of the periodic table defined by Mendeleef at a temperature sufficient for hydrogenation to occur.

10. A process as claimed in claim 8 in which the gas stream also contains at least carbonyl sulfide and carbon disulfide which are hydrolyzed to hydrogen sulfide along with hydrogenation of at least oxygen to water.

11. A process as claimed in claim 9 in which the industrial gas stream also contains at least carbonyl sulfide and carbon disulfide which are hydrolyzed to hydrogen sulfide along with hydrogenation of at least oxygen to water.

12. A process as claimed in claim 5 in which the alkali metal is selected from the group consisting of lithium, sodium, potassium, and mixtures thereof.

13. A process for the removal of hydrogen cyanide from gas streams which comprises contacting the gas stream in the presence of water in an amount at least sufficient to hydrolyze the contained hydrogen cyanide with a catalyst consisting of at least one alkali metal hydroxide deposited on support selected from the group consisting of alumina, silica, silica-alumina and the zeolites in which the deposited alkali metal hydroxide as the alkali metal is present in an amount of from about 2 to about 10 percent by weight based on the weight of the alkali metal and the support at a temperature from about 200°F to about 800°F for a time sufficient to hydrolyze a substantial quantity of the hydrogen cyanide present in the gas stream to ammonia.

14. A process as claimed in claim 13 in which hydroylsis of the hydrogen cyanide is carried out at a temperature from about 200°F to about 400°F.

15. A process as claimed in claim 13 in which the alkali metal is selected from the group consisting of lithium, sodium, potassium, and mixtures thereof.

16. A process for the removal of hydrogen cyanide from gas streams which comprises contacting the gas stream in the presence of water in an amount at least sufficient to hydrolyze the contained hydrogen cyanide with a catalyst consisting of at least one alkali metal hydroxide deposited on an alumina support in which the alkali metal hydroxide is present as the alkali metal in an amount of from about 0.1 to about 10 percent by weight based on the weight of the alkali metal and the support at a temperature from about 200°F to about 800°F for a time sufficient to hydrolyze a substantial quantity of the hydrogen cyanide present in the gas stream to ammonia.

17. A process as claimed in claim 15 in which hydrolysis of the hydrogen cyanide is carried out at a temperature from about 200°F to about 400°F.

18. A process as claimed in claim 15 in which the catalyst contains from about 2 to about 10 percent by weight alkali metal.

* * * * *